(12) United States Patent
Kessler et al.

(10) Patent No.: US 6,211,897 B1
(45) Date of Patent: Apr. 3, 2001

(54) PRINTING SYSTEM AND METHOD FOR IMPROVING PRINT QUALITY OF LASER THERMAL PRINTERS

(75) Inventors: David Kessler, Rochester; Timothy J. Tredwell, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/186,535

(22) Filed: Nov. 5, 1998

(51) Int. Cl.$^7$ ........................................... B41J 15/14
(52) U.S. Cl. ........................ 347/241; 347/256; 347/134
(58) Field of Search .................................. 347/241, 238, 347/256, 130, 134, 234; 359/30, 197, 204, 308, 588, 891; 385/115

(56) References Cited

U.S. PATENT DOCUMENTS

| | | | |
|---|---|---|---|
| 4,978,970 | * 12/1990 | Okazaki | 347/241 |
| 5,053,861 | * 10/1991 | Tsai et al. | 358/13 |
| 5,109,460 | 4/1992 | Baek et al. | 385/115 |
| 5,453,777 | 9/1995 | Pensavecchia et al. | 347/234 |
| 5,572,341 | * 11/1996 | Fergason | 359/39 |

* cited by examiner

*Primary Examiner*—N. Le
*Assistant Examiner*—Lamson D. Nguyen
(74) *Attorney, Agent, or Firm*—David A. Novais; Nelson Adrian Blish

(57) ABSTRACT

A laser thermal printing system and method utilizes a blur filter (3) made of one or more pieces of double refractive crystal material to smooth printing or laser spots or fill up gaps in an array of laser spots. Blur filter (3) is disposed between a light source (1) and a media or image plane (100). Light source (1) provides for an original array of laser spots (30) at media plane (100) and blur filter (3) splits an image of each of the original array of laser spots (30) to create a displaced duplicate array of laser spots (31) with improved spot uniformity.

14 Claims, 4 Drawing Sheets

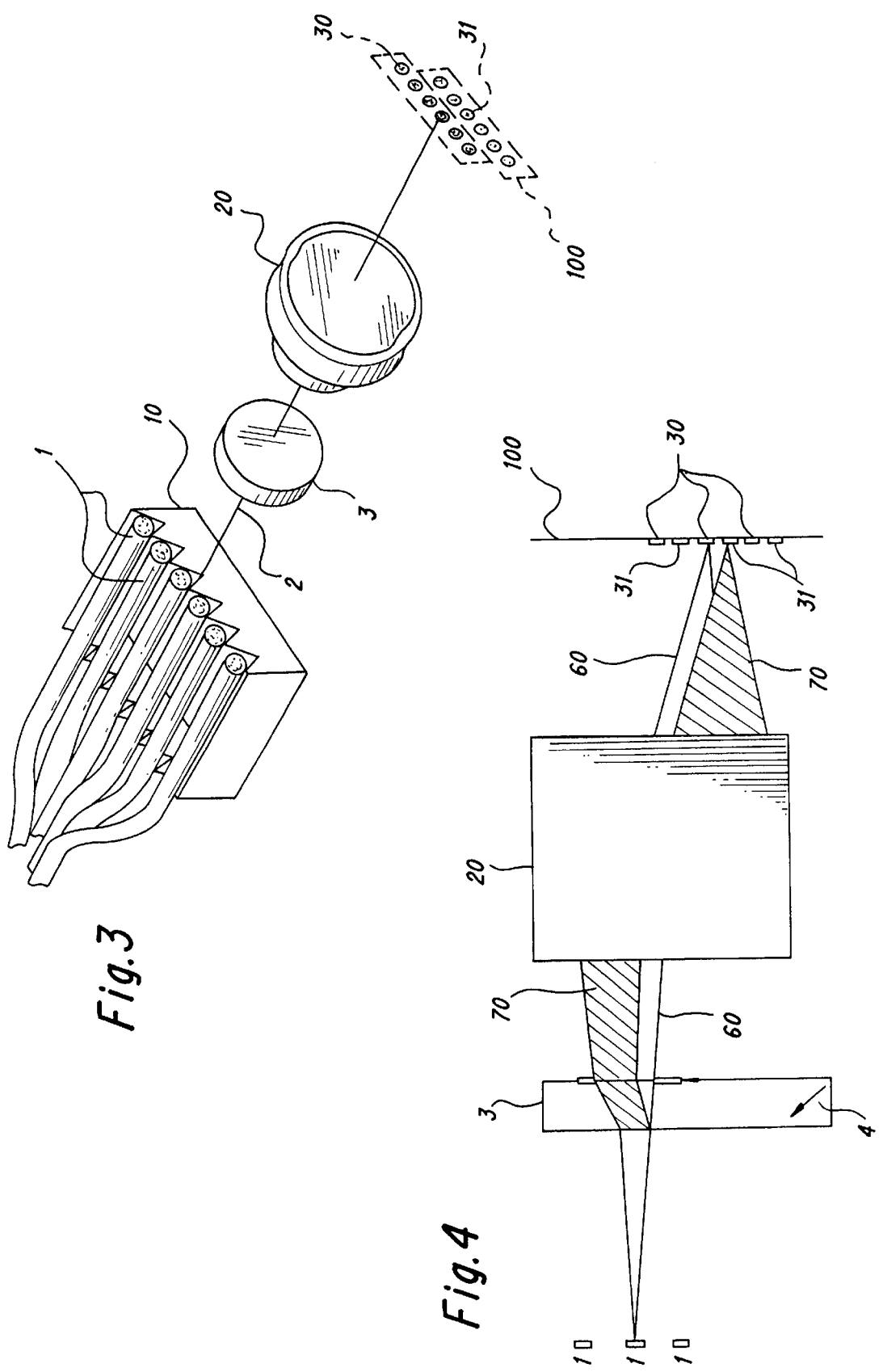

PRINTING SYSTEM AND METHOD FOR IMPROVING PRINT QUALITY OF LASER THERMAL PRINTERS

FIELD OF THE INVENTION

A printing system and method utilizes a blur filter which includes one or more pieces of double refracting crystal. This arrangement improves the smoothness of printing spots in a laser thermal printer and thereby prevents artifacts caused by hot spots within the printing spots.

BACKGROUND OF THE INVENTION

In laser thermal writing, the optical power of lasers is used to affect media as, for example, by a transfer of dye/ink from donor media to a receiver media. In order to enhance printing speed, high power density is needed at the media. One way to achieve high power is to use a number of independently modulated diode lasers. One such system is described in U.S. Pat. No. 5,109,460 to Baek assigned to Eastman Kodak Company, where each of the lasers is coupled to an optical fiber. The fibers are aligned on a v-grooved silicon substrate to form a fiber head which is then imaged onto the media using a printing lens. Another system is disclosed U.S. Pat. No. 5,453,777 assigned to Presstek, in which a number of pigtailed fibers are used where the fiber ends are arranged with spacings of 1 inch on the printing head, and each of the fibers is imaged by a dedicated printing lens onto the media.

High power laser light spots achieved by the above systems can affect the media either by the process of dye transfer, dye ablation or other light/media interaction mechanisms.

In some applications it is important to accurately control the printing process. For example, in laser thermal proofing systems, which use the process of laser thermal dye transfer, the density of the final print has to be very tightly controlled.

When the printing spots are not smooth in terms of their spatial distribution, occasional localized ablation can occur. The exact onset of the ablation process is not as well controlled as is the dye transfer process.

Variations in print density can then occur since more dye is typically transferred in the ablation process as compared with the dye transfer mode.

Also, when an array of spots produced by the printing head at the media is such that there are significant gaps between the spots, it may be beneficial to spread the light from each of the spots even when each one of them is an ideal uniform spot so as to fill up the gaps and prevent uneven printing.

In the case of fiber based systems, it is desirable to achieve a uniform illumination at the end of the fiber. However, in many cases the laser light has a measure of coherence which can produce laser speckle at the fiber ends. The spots pattern is highly dependent on the propagation through the fiber and can shift and change its shape as the fiber is moved such as when the printing head is translated in one direction during the process of printing.

One way to control and minimize the hot spots at the end of the fibers is to use a highly incoherent laser illumination by using as many fiber modes as possible. However by distributing the laser light into many fiber modes, the numerical aperture at the end of the fiber may increase and with it the depth of focus at the media will decrease. A short depth of focus is hard to maintain, and it commonly requires the use of special auto focus mechanisms.

SUMMARY OF THE INVENTION

An object of this invention is to overcome the drawbacks noted above by providing for a low cost means for smoothing the printing or laser spots in a laser thermal printer, or to fill up gaps in an array of printing spots without increasing the numerical aperture of the printhead, by using a blur filter made of one or more pieces of double refractive crystal material.

The effect of a double refractive crystal material is to convert about half of the light in a printing spot into a slightly displaced copy of the original spot. The doubling of the printing spot has the effect of smoothing the intensity variations at the end of the fiber or filling up the gaps between printing spots to allow for better control over the printing process.

It is noted that the blurring of printing spots as provided by a filter based on double refractors is very different than blurring a printing spot by defocusing the image. A good blur filter functions as a low pass filter where it is effective in high spatial frequencies but does not affect the mid frequencies where most of the image information is. Defocusing in general will affect the high and the mid frequencies while a double refractor based on splitting can be designed to affect only the high frequencies. While we use the term "blur filter", others have used other terms such as "anti-aliasing filter" or "low pass filter".

The present invention provides for a thermal printing system which comprises a light source that provides for a first array of laser spots in the form of a line on media located at a media plane; and a double refracting device disposed between the light source and the media plane. The double refracting device splits an image of each of the first array of laser spots so as to create a second array of laser spots.

The present invention further provides for a method of controlling a uniformity of spots of a laser thermal printer. The method comprises the steps of forming a first array of laser spots; imaging the first array of spots onto media at a media plane; and splitting the images of the first array of laser spots so as to create a second array of laser spots.

The above, and other objects, advantages and novel features of the present invention will become more apparent from the accompanying detailed description thereof when considered in conjunction with the following drawings.

BRIEF DESCRIPTION OF THE DRAWINGS

FIG. 3 is shows a printhead using a blur filter according to the present invention;

FIG. 4 shows a cross-section of the printhead of FIG. 3 to demonstrate the function of the blur filter according to the present invention;

DETAILED DESCRIPTION OF THE INVENTION

Figure 1:
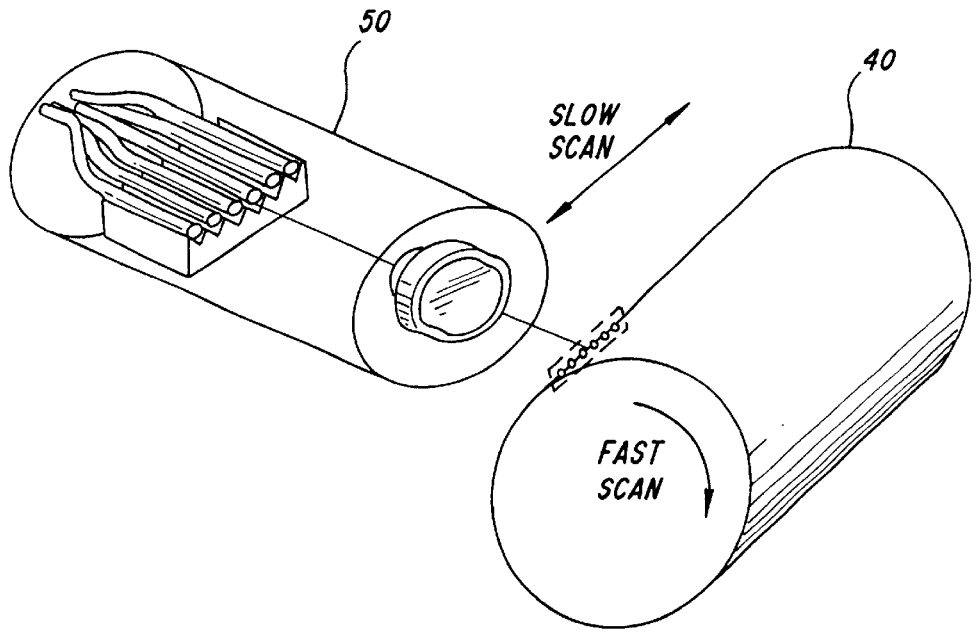
FIG. 1 is a drawing of a typical laser thermal printer according to the related art.

Referring now to the drawings, wherein like reference numerals designate identical or corresponding parts throughout the several views, FIG. 1 shows a printhead 50 according to the related art. Printhead 50 produces an array of independently modulated printing spots on media (not shown) which is placed on drum 40. As drum 40 rotates in the shown fast direction, printhead 50 is translated in the slow direction as shown to produce a full image.

Figure 2:
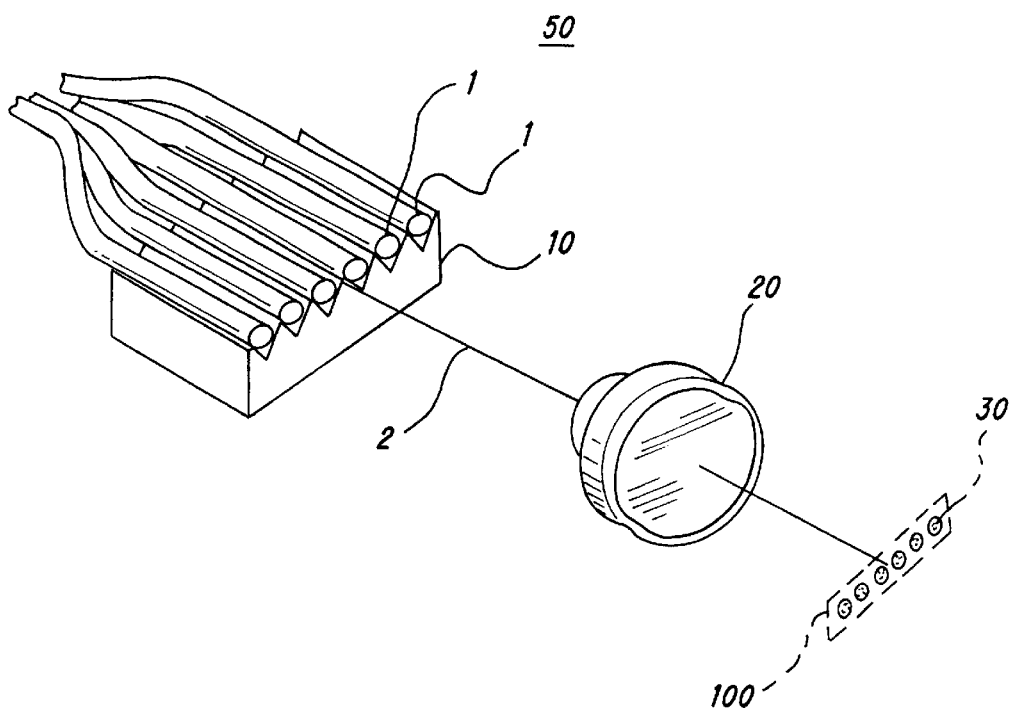
FIG. 2 shows in more detail a printing head according to the related art.

FIG. 2 show printhead 50 of the related art in more detail. Printhead 50 includes a light source in the form of fibers 1, with each of fibers 1 being coupled to an independently modulated laser (not shown). Fibers 1 are arranged in a form of a line by a grooved silicon aligner 10 and imaged onto a printing drum by a printing lens 20, to form an array of printing or laser spots 30 at a media or image plane 100.

Commonly the lasers coupled to fibers 1 are lasing at a wavelength of 750 to 980 nm. Typically the lasers are multi-mode edge emitting lasers and the fibers are also multi-mode fibers. Also, even though the radiated energy is typically invisible to the eye, it is still referred to as light.

Light distribution at the end of fibers 1 is not always uniform. Ideally one excepts the fiber core to be uniformly illuminated when a step index fiber is used or to have a Gaussian distribution when a gradient fiber is used. However, many factors can affect the light distribution at the end fibers 1, such as fiber bending, light leaking from the core to the cladding, the quality of the fiber facet polishing, the fiber numerical aperture (NA) and the launch conditions of the laser light into the fiber.

In dye transfer laser printing, the amount of dye transferred is dependent on the power density of the laser spot at the media. If the spot intensity is not uniform, and exhibit hot spots, it is likely that more dye will be transferred by the hot spots. Moreover, the distribution of the hot spots at the end of the fiber can change during printing due to fiber motion induced, for example, by the motion of the printhead.

FIG. 3 illustrates an embodiment of a printing system according to the present invention. As shown in FIG. 3, a double refracting device in the form of a blur filter 3 is used to create a displaced duplicate image or duplicate array of printing spots 31 of the original array of printing spots 30 at media plane 100. Blur filter 3 can be positioned between fibers 1 and a printing lens 20 or between printing lens 20 and media plane 100. The displacement of array of spots 31 from the original array of spots 30 as shown in FIG. 3 is exaggerated for illustration purposes. The actual displacement is commonly smaller than the size of a spot.

FIG. 4 explains in more detail the function of blur filter 3. Blur filter 3 is made of a uniaxial crystal (prism) such as crystal quartz, calcite or Lithium Niobate, whose crystal axis 4 can be positioned at an angle of usually 45 degrees to the filter facets as shown. If unpolarized light from fibers 1 enters blur filter 3, blur filter 3 will transmit a portion of it unaffected (this is called an ordinary beam 60), and the rest of the light will be displaced as shown (called an extraordinary beam 70), such that at media plane 100, ordinary beams 60 from all of fibers 1 will focus to form original array of printing or laser spots 30, and extraordinary beams 70 from all of fibers 1 will form displaced duplicate array of printing or laser spots 31 as shown.

In the embodiment of FIG. 4, blur filter 3 is shown between fibers 1 and printing lens 20, such that printing lens 20 images ordinary beam 60 and extraordinary bean 70 onto media plane 100 as shown. It is recognized that as an alternative, blur filter 3 can be located between printing lens 20 and media plane 100.

Figure 5A:
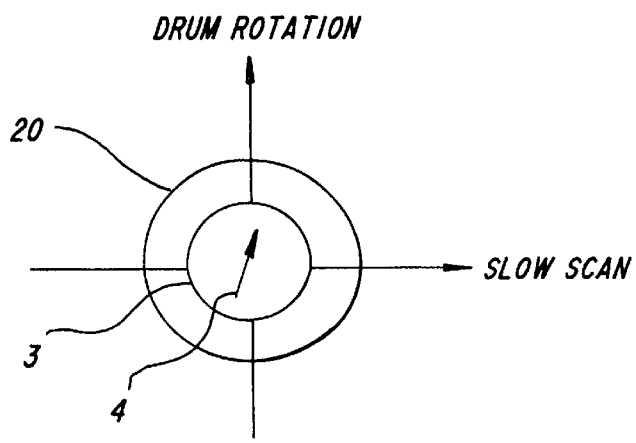
FIGS. 5(a) and 5(b) show another view of the printing spots created by the blur filter according to the present invention.
Figure 5B:
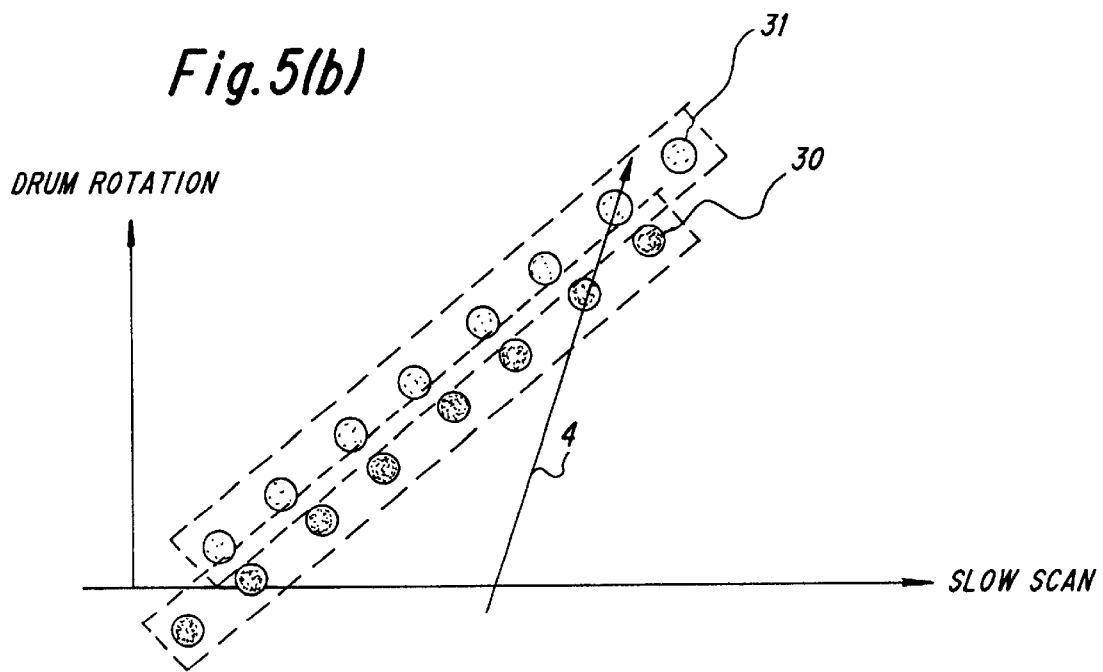

FIGS. 5(a) and 5(b) show further views to better explain the function of blur filter 3. FIG. 5(a) shows a view from drum 40 into printhead 50 where printing lens 20, blur filter 3 and crystal axis 4 of blur filter 3 are shown. FIG. 5(b) shows array of laser spots 30,31 at media plane 100 with respect to drum rotation and slow scan. As described above, array 30 is the original array without blur filter 3, while array 31 is the duplicate and displaced array of laser spots created by blur filter 3. The displacement is in the direction of crystal axis 4 as shown. That is, blur filter 3 splits the image of each of original laser spots 30 so as to create an array of duplicate laser spots 31 which can be larger and have an improved spot uniformity.

Note that both array of spots 30,31 in FIG. 5(b) are tilted with respect to the drum rotation direction. This is a common technique used in laser thermal printing to obtain high resolution printing, i.e. small pitch, namely small dot to dot separation, from spots which are displaced from one another by a distance larger then the required printing pitch.

For blur filter 3 to perform optimally, the light should be unpolarized so that half of it will be delivered in original array of spots 30 and the other half in displaced array of spots 31. In fiber based printheads, the light at the end of the fiber is essentially unpolarized.

If the light is polarized in a certain direction, and we want to have 50% of the light displaced by blur filter 3, then crystal axis 4 should be at 45 degrees to the polarization direction. If this is not a preferred direction for the displacement, one can always change the direction of polarization and thus the direction of the polarization using a half wave plate.

Figure 6A:
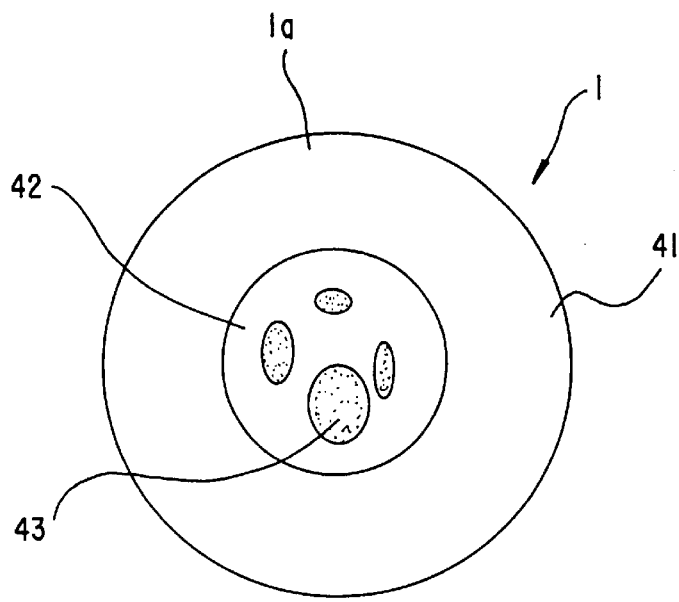
FIGS. 6(a) and 6(b) show a typical view at the end of a fiber, FIG. 6a showing the spot without the filter, and FIG. 6b showing the spot with the filter.
Figure 6B:
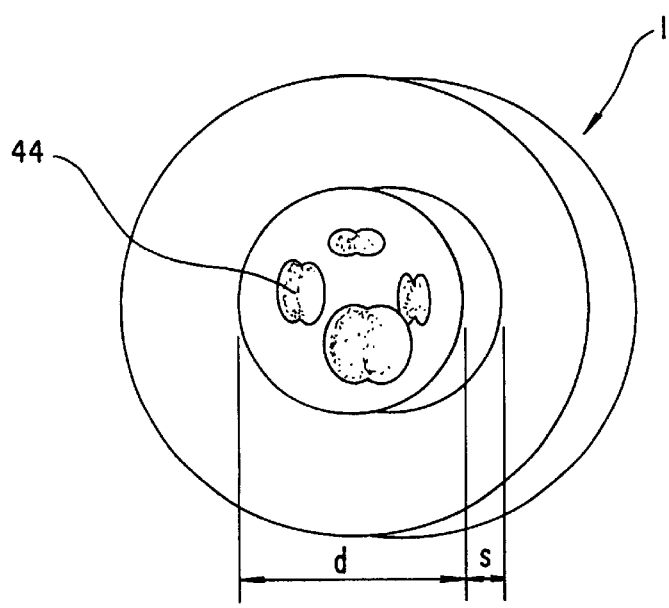

FIGS. 6(a) and 6(b) show views of a fiber end 1a of fiber 1. As illustrated, fiber 1 includes a clad 41 with a core 42. FIG. 6(a) shows clad 41, core 42 and hot spots 43 with no blur filter. FIG. 6(b) shows fiber end 1a and its displaced image where hot spots 44 are now double in size namely with lower power density.

Reference will now be made to the following design example:

The fibers used have 125 microns clad diameter and 50 microns core. The light coming from the core is unpolarized and the wavelength is 830 nm. The blur needed to smooth the hot spots in the core is determined to be about 25 microns which is about half the core size.

A displacement S between the spots, as measured in the fibers' plane, by a double refractive filter such as the described blur filter 3 is given by the following equations:

$$S = t*(N_o^2 - N_e^2)*\text{Tan}(\alpha)/(N_o^2 + N_e^2*\text{Tan}^2(\alpha))$$

where $N_0$ and $N_e$ are the ordinary and extraordinary indices of refraction of the crystal. For crystal quartz in at 830 nm they are given by: No.=1.53773 and Ne=1.54661.

t is the plate thickness of blur filter 3.

α is the angle between the crystal optical axis (4 on FIG. 4) and the normal to the surface of blue filter 3.

The maximum displacement S occurs when the angle α is about 45°.

Solving the equation using crystal quartz with crystal angle α of 45 degrees, the crystal thickness needed to produce 50 microns of beam displacement is 4.34 mm. If Lithium Niobate is used which has larger birefringence, the thickness would have been 0.650 mm for the same displacements. If calcite is used which has much larger birefringence the thickness would have been 0.236 mm for the same displacements.

As an example, the diameter d of original laser spots 30 at media plane 100 can be given by 5<d<20 microns. Each laser spot 30 is split into two spots to create duplicate laser spots 31 such that displacement distance S between the array of spots 30 and the array of spots 31 is set forth according to the relation 0.2d<S<d (see FIG. 6(*b*)).

The invention has been described in detail with particular reference to preferred embodiments thereof, but it will be understood that variations and modifications can be effected within the spirit and scope of the invention. In particular it should be noted that the blur filter is not limited to multi mode lasers or fibers. It can be used with single mode lasers and in multi spot printers using spatial light modulators. Although the term "dye" has been used in the description of the present invention, it is recognized that other material such as pigments, ink etc., could be used within the context of the present invention.

The invention has been described in detail with particular reference to certain preferred embodiments thereof, but it will be understood that variations and modifications can be effected within the spirit and scope of the invention.

What is claimed is:

1. A laser thermal printing system comprising:
    a light source which provides for a first array of laser spots in the form of a line on media located at a media plane; and
    a double refracting device disposed between said light source and the media plane, said double refracting device splitting an image of each of said first array of laser spots so as to create a second array of laser spots.

2. A laser thermal printing system according to claim 1, wherein said second array of laser spots is a displaced array of duplicate laser spots.

3. A laser thermal printing system according to claim 1, further comprising at least one printing lens located between said double refracting device and said media plane.

4. A laser thermal printing system according to claim 1, further comprising at least one printing lens located between said light source and said double refracting device.

5. A laser thermal printing system according to claim 1, wherein said light source is an array of fiber optics.

6. A laser thermal printing system according to claim 1, wherein said double refracting device is made of uniaxial crystal in the form of crystal quartz, calcite or Lithium Niobate.

7. A laser thermal printing system according to claim 1, wherein said double refracting device is a blur filter.

8. A laser thermal printing system according to claim 1, wherein laser spots in the first array of laser spots have a diameter of d microns, such that 5<d<20 microns, and laser spots in the second array of laser spots are separated from the laser spots in the first array of laser spots by a distance S according to the relation 0.2d<S<d.

9. A laser thermal printing system according to claim 1, wherein said first array of laser spots are independently modulated laser spots.

10. A method of controlling a uniformity of spots of a laser thermal printer, the method comprising the steps of:
    forming a first array of laser spots;
    imaging said first array of laser spots onto media at a media plane; and
    splitting said images of said first array of laser spots so as to create a second array of laser spots, wherein said step of splitting said images of said first array of laser spots comprises the step of placing a double refractive material between a light source which provides for said first array of laser spots and said media plane.

11. A method according to claim 10, wherein said second array of laser spots is a displaced duplicate array of laser spots.

12. A method according to claim 10, comprising the further step of forming said double refracting material of a uniaxial crystal.

13. A method according to claim 10, wherein said first array of laser spots are independently modulated laser spots.

14. A laser thermal printing system comprising:
    a light source which provides for a first array of laser spots in the form of a line on media located at a media plane;
    a double refracting device disposed between said light source and the media plane, said double refracting device splitting an image of each of said first array of laser spots so as to create a second array of laser spots; and
    wherein said second array of laser spots overlaps said first array of laser spots.

* * * * *